(12) United States Patent
Bourne et al.

(10) Patent No.: US 8,117,064 B2
(45) Date of Patent: Feb. 14, 2012

(54) SYSTEMS AND METHODS FOR WORKFORCE OPTIMIZATION AND ANALYTICS

(75) Inventors: John Bourne, Alpharetta, GA (US); Ed Murray, Fairhaven, MA (US); Jeff Iannone, Alpharetta, GA (US); Shimon Keren, Sunnyvale, CA (US); Nick McLean, Duluth, GA (US); Mike Bourke, San Francisco, CA (US); Jason Fama, Foster City, CA (US); Joseph Watson, Alpharetta, GA (US); James Gordon Nies, Carmel, IN (US); Thomas Lyerly, Marietta, GA (US)

(73) Assignee: Verint Americas, Inc., Roswell, GA (US)

(*) Notice: Subject to any disclaimer, the term of this patent is extended or adjusted under 35 U.S.C. 154(b) by 1111 days.

(21) Appl. No.: 11/359,358

(22) Filed: Feb. 22, 2006

(65) Prior Publication Data
US 2007/0198323 A1    Aug. 23, 2007

(51) Int. Cl.
*G06Q 10/00* (2006.01)
(52) U.S. Cl. ...................... 705/7.38; 705/7.42
(58) Field of Classification Search ............... 705/7.38, 705/7.42
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,117,225 A | 5/1992 | Wang | |
| 5,210,789 A | 5/1993 | Jeffus et al. | |
| 5,239,460 A | 8/1993 | LaRoche | |
| 5,241,625 A | 8/1993 | Epard et al. | |
| 5,267,865 A | 12/1993 | Lee et al. | |
| 5,299,260 A | 3/1994 | Shaio | |

(Continued)

FOREIGN PATENT DOCUMENTS

| | | |
|---|---|---|
| CA | 2262044 | 10/1999 |
| EP | 0453128 A2 | 10/1991 |
| EP | 0773687 A2 | 5/1997 |

(Continued)

OTHER PUBLICATIONS

Quiggins et al ("A New approach to Contact Center Optimization," IEX Corporation, 2004).*

(Continued)

*Primary Examiner* — Lynda Jasmin
*Assistant Examiner* — George H Walker
(74) *Attorney, Agent, or Firm* — McKeon, Meunier Carlin & Curfman

(57) ABSTRACT

Systems and methods are disclosed for an optimizing operations at a contact center. In one embodiment, an integrated contact center comprises: a content recorder configured to record content of plurality of agent interactions; an analytics component configured to perform speech analysis on at least a portion of the agent interactions, and further configured to evaluate the interactions based on a plurality of criteria, producing a score; and a quality monitor configured to associate the analyzed interactions with interaction metadata.

3 Claims, 11 Drawing Sheets

U.S. PATENT DOCUMENTS

| | | |
|---|---|---|
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,628,777 B1 | 9/2003 | McIllwaine et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 * | 6/2004 | Blair et al. .................. 379/67.1 |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,970,829 B1 | 11/2005 | Leamon |
| 7,013,005 B2 * | 3/2006 | Yacoub et al. ........... 379/265.13 |
| 7,036,075 B2 * | 4/2006 | Walker .......................... 715/201 |
| 7,058,589 B1 | 6/2006 | Leamon et al. |
| 7,092,509 B1 | 8/2006 | Mears et al. |
| 7,149,788 B1 | 12/2006 | Gundla et al. |
| 7,158,628 B2 * | 1/2007 | McConnell et al. ...... 379/265.02 |
| 7,174,010 B2 | 2/2007 | McIlwaine et al. ...... 379/265.01 |
| 7,487,435 B2 | 2/2009 | Aviv |
| 7,546,173 B2 * | 6/2009 | Waserblat et al. .............. 700/94 |
| 7,765,471 B2 * | 7/2010 | Walker .......................... 715/245 |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0009372 A1 | 1/2003 | Nyhan et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2004/0249650 A1 * | 12/2004 | Freedman et al. .................. 705/1 |
| 2005/0013560 A1 | 1/2005 | Lee et al. |

| | | | |
|---|---|---|---|
| 2005/0069119 | A1 | 3/2005 | Erhart et al. |
| 2006/0062376 | A1 | 3/2006 | Pickford |
| 2006/0179064 | A1 | 8/2006 | Paz et al. |
| 2006/0198504 | A1 | 9/2006 | Shemisa et al. |
| 2006/0233346 | A1* | 10/2006 | McIlwaine et al. ...... 379/265.02 |
| 2006/0256953 | A1 | 11/2006 | Pulaski et al. |
| 2007/0019618 | A1 | 1/2007 | Shaffer et al. |
| 2007/0043571 | A1* | 2/2007 | Michelini et al. .......... 704/270.1 |
| 2007/0121824 | A1* | 5/2007 | Agapi et al. ............... 379/88.18 |

FOREIGN PATENT DOCUMENTS

| | | |
|---|---|---|
| EP | 0989720 | 3/2000 |
| GB | 2369263 | 5/2002 |
| WO | WO 98/43380 | 11/1998 |
| WO | WO 00/16207 | 3/2000 |
| WO | 2004090770 A1 | 10/2004 |

OTHER PUBLICATIONS

Gans et al ("Telephone Call Centers: Tutorial, Review,and Research Prospects," Manufacturing & Service Operations Management, vol. 5, No. 2, Spring, 2003, pp. 79-141, 1523-4614/03/0502/0079, 1526-5498 electronic ISSN.*

Scot M. Duguay, Keith A Korbut. "Designing a training program which delivers results quickly!" Industrial and Commercial Training. Guilsborough: 2002. vol. 34, Iss. 6/7; p. 223.*

Definitions of and Synonyms for "Experience" downloaded from http://www.merriam-webster.com/dictionary/experience, http://www.oxforddictionaries.com/definition/experience?view=uk and http://thesaurus.com/browse/experience on Jan. 28, 2011.

* cited by examiner

SYSTEMS AND METHODS FOR WORKFORCE OPTIMIZATION AND ANALYTICS

FIELD OF THE DISCLOSURE

The present disclosure relates to workforce optimization of contact centers.

BACKGROUND

The business of a call center, also known as a contact center, is to provide rapid and efficient interaction between agents and customers (or prospective customers). Existing solutions require the purchase of multiple hardware and software components, typically from different vendors, to achieve the business goals of the contact center. The use of separate systems of components leads to a variety of problems. For instance, each system typically has its own method of configuration and its own user interface. Thus, exchanging data between the systems requires additional work by someone at the contact center.

Furthermore, contact centers are continually tasked with striking a balance between service quality, efficiency, effectiveness, revenue generation, cost cutting, and profitability. As a result, today's contact center agents are charged with mastering multiple data sources and systems, delivering consistent service across customer touch points, up-selling, cross-selling, and saving at-risk customers, while winning new ones.

SUMMARY OF THE INVENTION

Systems and methods are disclosed for an optimizing operations at a contact center. In one embodiment, an integrated contact center comprises: a content recorder configured to record content of plurality of agent interactions; an analytics component configured to perform speech analysis on at least a portion of the agent interactions, and further configured to evaluate the interactions based on a plurality of criteria, producing a score; and a quality monitor configured to associate the analyzed interactions with interaction metadata.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
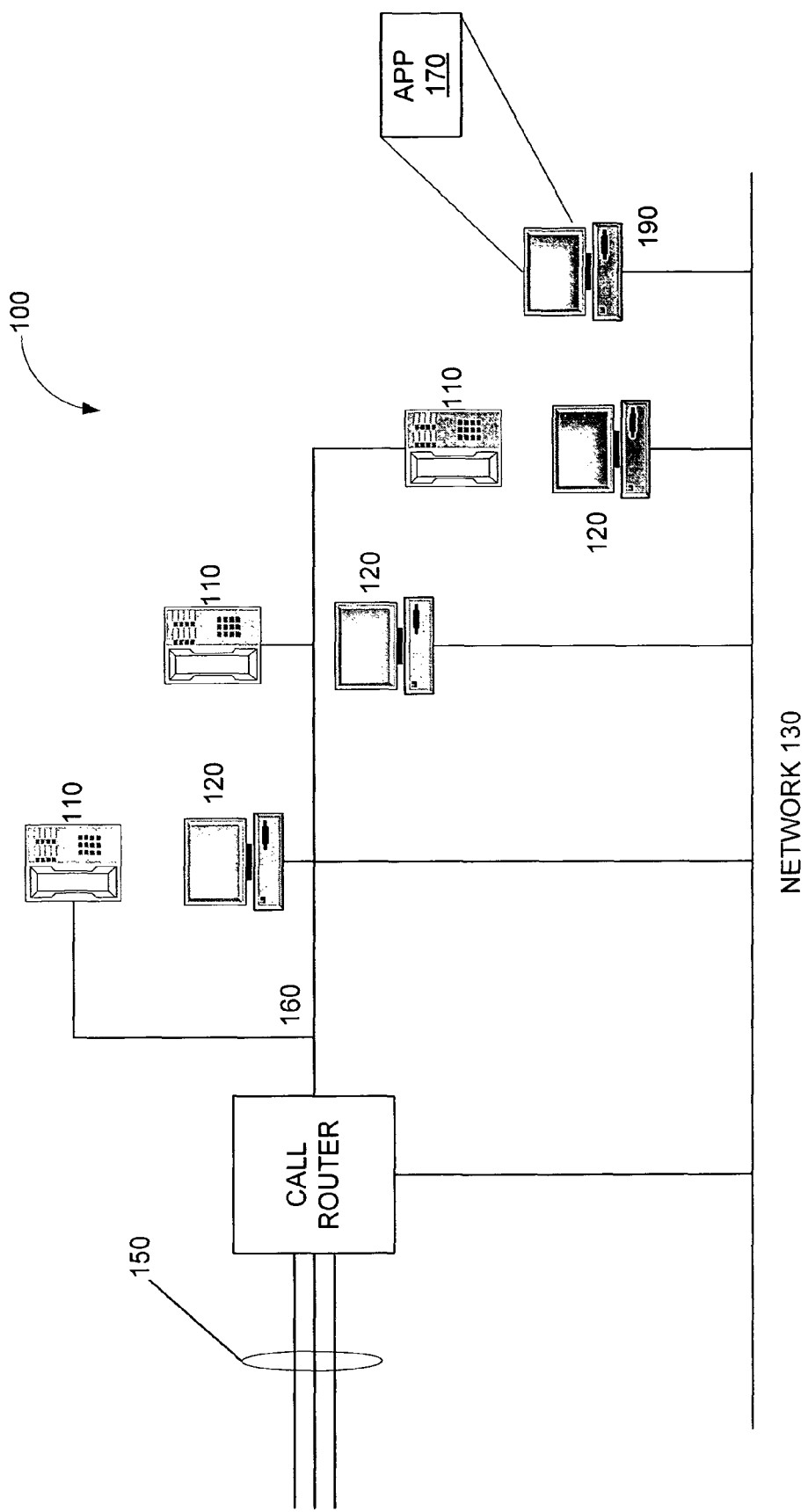
FIG. 1 is a block diagram of a contact center environment.

The systems and methods described herein provide integrated solutions for performing workforce management, quality monitoring, e-learning, performance management, and analytics functionality. Combining quality monitoring/call recording with performance management and e-learning functionality as a unified integrated solution, delivered through a single platform, enables users to gain more insight and make smarter decisions faster about sales, service, and overall operations. This takes contact center tools beyond the traditional "suite" approach to a true single workforce optimization platform.

The present invention represents a convergence of five contact center technology segments that work together in support of a greater customer service strategy. In short, the integrated workforce optimization platforms disclosed herein integrate: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance These five segments can become part of an interwoven and interoperable solution, enabling contact centers to transition from reactive cost centers to proactive, information-rich departments that deliver strategic value to the organization. These four segments become part of an interwoven and basic integrated solution, enabling contact centers to transition from reactive cost centers to proactive, information-rich departments that deliver strategic value.

Further, the integrated workforce optimization platforms disclosed herein provide closed-loop systems for continuous performance improvement, enabling contact centers to: establish realistic forecasts and performance goals; schedule and deploy the right number of staff with the appropriate skills; capture customer interactions in their entirety by recording all calls, or recording based on business rules, or on-demand, or randomly; measure performance to identify execution issues and excellence; analyze customer interactions to investigate opportunities for optimizing use of people, processes and technologies; take action by delivering targeted training or re-engineering processes; and/or refine forecasts and performance goals based on the collected data.

One embodiment of the integrated process and system disclosed herein begins with planning and establishing goals—from both an enterprise and center perspective—to ensure alignment and objectives that complement and support one another. Next comes forecasting and scheduling of the workforce to ensure optimum service levels. Then recording and measuring performance are utilized, leveraging quality monitoring/call recording to assess service quality and the customer experience.

Next, the process/system analyzes and identifies opportunities and correlates them the with contact center or organization's KPIs and scorecards. Then, e-learning and company-specific "best practices" (documented through captured customer interactions) make it possible to address skill and knowledge gaps efficiently and effectively—as well as quickly communicate policy or procedural changes across the center—enabling the contact center to achieve success in whatever terms it chooses to define. Rather than arbitrarily sending e-learning training segments and hoping agents use them, contact centers can use advanced workforce management forecasting and scheduling to select the best time to administer training (which is proven to be more effective than classroom or group learning) as well as free supervisors to work one-on-one with agents.

Quality monitoring scores, including insights from analytics and/or analytical analysis of structured, unstructured, or aggregated data, can next be fed into a workforce management to produce staffing models that prevent companies from unknowingly scheduling one shift with all the top performers, for example. As a result, some embodiments of the workforce management component of the process/system of the present invention can provide a higher level of consistent service across shifts.

As can be seen, while each technology segment delivers value, integration is the key: together the segments deliver greater impact than the sum of their individual parts. Utilizing them separately limits the contact center's potential to become a strategic business asset.

The integrated systems for workforce optimization disclosed herein potentially solve many deficiencies in today's maturing contact center industry. For instance, at an operational level, centers are focused on optimizing customer sales/service representative (CSR) performance. In the process, they may be working under constraints, such as cost control and infrastructures that provides only bare essentials. They may also face the challenge of matching demand with resources, retaining effective agents, prioritizing coaching/training, and delivering consistent customer experiences. Leveraging an integrated system and its components, such as forecasting and scheduling, voice/screen capture/recording, evaluations and best practice training, enables them to focus on reducing risk, decreasing average handle time, improving quality scores, driving down average time to answer, ensuring adherence and managing occupancy.

At a more advanced level, contact centers are focused on optimizing contact center performance. They face the challenge of balancing productivity with quality, increasing center-driven revenue, standardizing service across touch points, and growing transaction complexities. Contact centers are examining such metrics as first call resolution, shrinkage, up-selling and cross-selling, and customer satisfaction as driven though the contact center. As disclosed herein, the forecasting and scheduling, adherence, business rules-driven recording, lesson management, and agent/organizational scorecard functionality—for example—unites contact center experiences, provides flexible scheduling, and promotes the initiation of a performance improvement culture.

The subject matter disclosed herein is related to the subject matter disclosed in several pending U.S. patent applications. One is entitled "Enterprise Manager for Recorders from a Central Point of Administration," having application Ser. No. 11/359,325, filed Feb. 22, 2006, and entirely incorporated by reference herein. The subject matter of the 1180 application is centralized administration of voice, video, and data recorders, and enabling role-based access control of recorders which do not have role-based security concepts.

Another is "Systems and Methods for Scheduling Call Center Agents using Quality Data," having application Ser. No. 11/359,909, filed Feb. 22, 2006, and entirely incorporated by reference herein.

Another is "Systems and Methods for Scheduling Call Center Agents using Quality Data and Correlation-Based Discovery," having application Ser. No. 11/359,731, filed Feb. 22, 2006, and entirely incorporated by reference herein.

Another is "System and Method for Integrating Learning Systems and Scorecards Systems", having application Ser. No. 11/359,359, filed Feb. 22, 2006, and entirely incorporated by reference herein.

Another is "System and Method for Integrating Learning Systems and Workforce Management Systems", having application Ser. No. 11/359,194, filed Feb. 22, 2006, and entirely incorporated by reference herein.

Another is U.S. application Ser. No. 10/136,705, entitled "Method and System for Presenting Events Associated with Recorded Data Exchanged between a Server and a User," and entirely incorporated by reference herein. The subject matter of the '705 application includes capturing and graphically displaying events that occur during an interaction between a customer and an agent. A reviewer is presented with a summarized voice interaction session, in the form of a call timeline, including a list of event identifiers. The reviewer selects one of the event identifiers in the timeline, and the interaction session, starting with the selected event, is presented to the user. The user could choose to start listening to the exchange at an event by selecting the event.

Another is U.S. application Ser. No. 10/137,480, entitled "Method and System for Selectively Dedicating Resources for Recording Data Exchanged between Entities Attached to a Network," filed on Apr. 30, 2002, and entirely incorporated by reference herein. The subject matter of the '480 application includes determining whether to use an active tap or a passive tap to record data passing through a particular node based upon an objective for recording as noted by predefined business rules.

Another is U.S. Ser. No. 10/136,735, entitled "Methods and Systems for Categorizing and Cataloguing Recorded Interactions," filed on Apr. 30, 2002, and entirely incorporated by reference herein. The subject matter of the '735 application includes categorizing data upon storing the captured data. The categories are based upon predefined business rules for storing captured data.

Another is U.S. application Ser. No. 10/061,469, entitled "Method, Apparatus, and System for Capturing Data Exchanged between a Server and a User," filed on Jan. 31, 2002, and entirely incorporated by reference herein. The subject matter of the '469 application includes capture of exchange data by a capture module that operates independently from the server and the user.

Another is U.S. application Ser. No. 10/061,489, entitled "Method, Apparatus, and System for Processing Data Captured during Exchanges between a Server and a User," filed on Jan. 31, 2002, and entirely incorporated by reference herein. The subject matter of the '489 application includes selective recordation of captured data based upon whether the data satisfies predetermined business rules.

Another is U.S. application Ser. No. 10/061,491, entitled "Method, apparatus, and system for replaying data selected from among data captured during exchanges between a server and a user," filed on Jan. 31, 2002, and entirely incorporated by reference herein. The subject matter of the '491 application includes replaying data captured during a session, wherein search criteria are based upon business rules.

The following is a list of other U.S. utility applications which include related subject matter, each of which is enclosed by reference: U.S. utility application, entitled, "Method and Apparatus for Long-Range Planning," having Ser. No. 09/899,895, filed Oct. 3, 2002; U.S. utility application entitled, "Interface System and Method of Building Rules and Constraints For a Resource Scheduling System," having Ser. No. 09/680,131, filed Oct. 2, 2000; U.S. Utility Application entitled, "System and Method for Complex Schedule Generation," having Ser. No. 09/825,589, filed Apr. 3, 2001; U.S. utility application entitled, "Method and Apparatus for Long-Range Planning," having Ser. No. 09/899,895, filed Jul. 5, 2001; U.S. utility application entitled, "Method and Apparatus for Multi-Contact Scheduling," having Ser. No. 11/037,604, filed Jan. 18, 2005; and U.S. Utility application entitled, "Method and Apparatus for Concurrent Error Identification in Resource Scheduling," having Ser. No. 11/237,456, filed Sep. 27, 2005.

Contact Center Environment

FIG. 1 is a block diagram of a contact center environment 100. The contact center 100 is staffed by agents who handle incoming and/or outgoing contacts. Although the traditional and most common form of contact is by phone, other types of contacts are becoming more common (e.g., text chat, web collaboration, email, and fax). An agent workspace includes an agent phone 110 and a workstation computer 120. A network 130 connects one or more of the workstations 120.

A call router 140 distributes incoming contacts to available agents. When the contacts are made by traditional phone lines, the call router 140 operates by connecting outside trunk lines 150 to agent trunk lines 160. In this environment, the call router 140 may be implemented by an automatic call distributor (ACD), which queues calls until a suitable agent is available. Other types of contacts, such as Voice over Internet Protocol (VoIP) calls and computer-based contacts (e.g., chat, email) are routed over one or more data networks. These contacts are distributed over network 130 to one of the agent workstations 120.

During a customer contact, the agent interacts with one or more applications running on the workstation 120. Example workstation applications give the agent access to customer records, product information, ordering status, and transaction history, for example.

The business purpose of a contact center is to provide rapid and efficient interaction between agents and customers. To achieve this purpose, a contact center follows a business process having stages, in that one stage affects subsequent stages.

In a conventional contact center business process, there is a relatively high degree of separation between stages. In contrast, in the integrated contact center business process 200 (FIG. 2) described here, multiple stages are connected into a loop, with each stage of the process feeding input into another stage down the line.

First Embodiment

Figure 2:
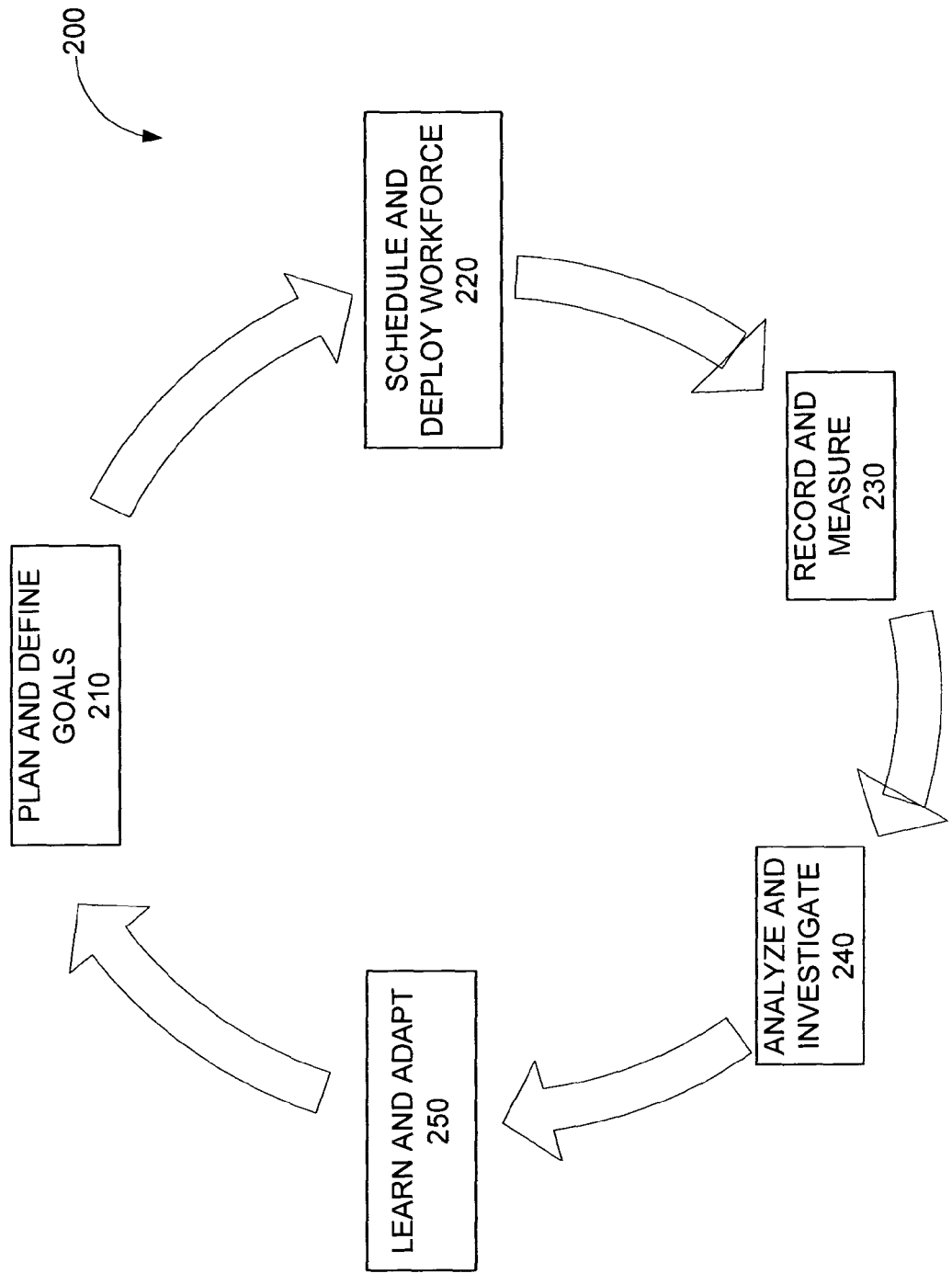
FIG. 2 is a diagram of one embodiment of the integrated process for optimizing operations at a contact center.

FIG. 2 is a diagram of one embodiment of the integrated process for optimizing operations at a contact center (200), in which several interfaced organizations are combined as a single integrated operational process and/or platform. In the first stage (210), the business goals of the contact center are defined. Goals are defined in terms of metrics that describe how the contact center is expected to perform. Some metrics relate to expected revenue, such as revenue/hour or revenue/agent. Other metrics relate to service level, such as time-to-answer and rate of first-call resolution. Persons familiar with contact center operations will understand these and many other business goals and metrics.

The first stage (210) may also include campaign planning. Profiles for campaigns are defined, for example by: inbound or outbound; how many contacts are expected; date and duration of the campaign; and what sorts of agent skills are needed.

Information about the goals and campaign(s) produced by the first stage (210) is provided to the second stage (220). In the second stage (220), a workforce of agents is scheduled to staff the campaign(s). In determining the number of agents scheduled for a campaign, the goals/metrics and campaign characteristics from the first stage (210) are considered. The schedule also uses as input a workload forecast, which predicts contact volume during each interval of the campaign, based on historical data. Using this schedule, the contact center manager deploys the appropriate number and mix of agents during the campaign times.

The output of the second stage (220) is the customer-agent interactions that occur during a campaign. The third stage (230) measures or assesses the interactions in various ways. One typical assessment ("adherence") measures how well an agent complied with contact center policies (e.g., call duration). In the third stage (230), at least a portion of the interactions are recorded and then examined. This examination produces a variety of quality metrics that assess an agent's skills in various categories (product knowledge, selling, listening, etc.)

The various assessments are provided as input to the fourth stage (240). In this stage, these inputs are analyzed in various ways. The analysis may rate interactions on a "good" to "bad" scale, considering the customer point of view, the business point-of-view, or both. For example, a contact that resulted in a sale would be an indicator of a "good" interaction while a contact that exceeded average duration would be an indicator of a "bad" interaction.

Once "bad" interactions are identified, an attempt is made to determine a root cause. In some cases, the root cause may lie with an agent (e.g., weak product skills). In other cases, the cause may be in the contact center infrastructure or operations (e.g., customer database is slow). The cause might also be rooted in a business process of the enterprise that is sponsoring the campaign. For example, the billing process used by the enterprise, or the process by which the enterprise dispatches field service units could be the cause.

The fifth stage (250) uses the analysis produced by the fourth stage (230) to adapt and change operations accordingly. Agent skills can be improved by training in the deficient areas. The information may be used to change an aspect of contact center operations, or to make a recommendation to the sponsoring enterprise for it to change its processes or operations. The results of the analysis, as well as the raw metrics used as input to the analysis, are combined into data sets ("scorecards") that allow the contact center operators to determine whether or not the business goals are met and whether the metrics show progress toward the goals or away from the goal ("trending"). These data sets are provided as input to the first stage (210), which closes the feedback loop of the integrated contact center business process 200.

Second Embodiment

Figure 3:
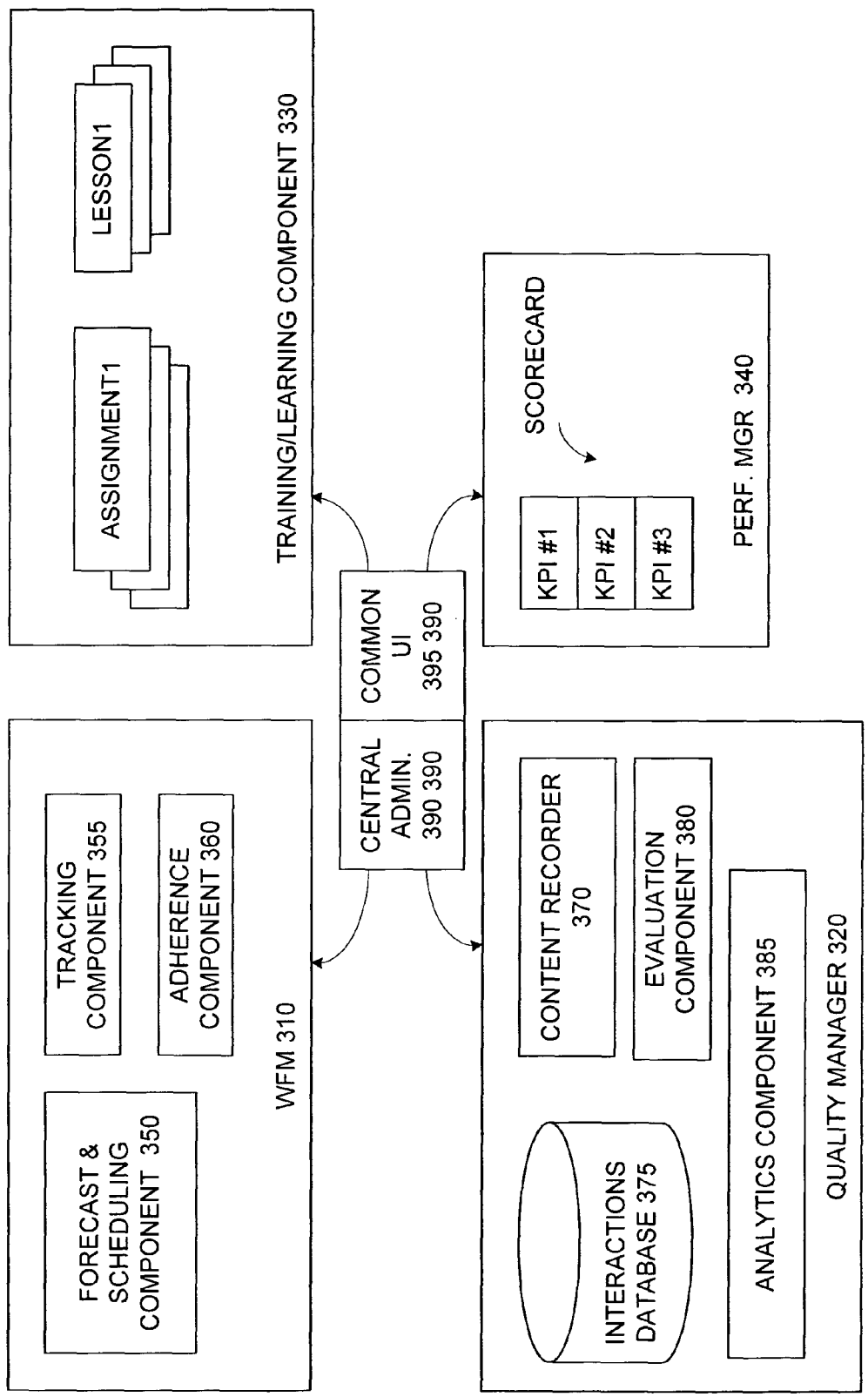
FIG. 3 is a high-level view of components in one embodiment of an integrated contact center system.

FIG. 3 is a high-level view of components in one embodiment of an integrated contact center system 300. The integrated system 300 includes two or more of the following components: a work force manager (WFM) 310; a quality monitoring component 320; a learning component 330; and a performance management component 340. These components (310-340) cooperate to implement the integrated contact center business process (200) as described earlier.

As will be described, combining agent quality metrics from the quality monitor 320 (e.g., synchronous such as voice, asynchronous such as e-mail or chat) with WFM 320 (e.g., agent planning, scheduling) may provide insight that contact center supervisors can use to confirm the value provided by agents to the business as a whole.

The WFM 310 performs many functions related to the agent workforce. For example, WFM 310 can: schedule single, multiple, or virtual contact centers across multiple time zones; accommodate a dedicated, blended, or task-switching environment; schedule meetings or training without impact on service levels; allow agents to bid for shifts and provide input into their schedules; automate compliance with government and union regulations; create centralized forecasts and schedules with a single point of control over the entire network, or decentralized schedules that allow for decision-making at individual sites; schedule based on skill priorities that align with the contact center's routing strategy; and create and schedule teams as a unit to support training and accommodate employee preferences.

The functionality of the entire WFM 310 is typically divided among several applications, executables, processes, or services. A forecast and scheduling component (350) calculates staffing levels and agent schedules based on historical interaction (contact) patterns. A tracking component (355) provides a contact center supervisor or manager with information about agent activities and agent-customer interactions, both historical and real-time. An adherence component (360) supplies the supervisor with information on how well each agent complies with call center policies. For example, once schedules are created, the contact center should ensure that agents follow the schedules.

Most preferably, the adherence component 360 provides a real-time view of every activity across each channel in the contact center, including those in the front and back office, so supervisors/contact centers can see how their staff spends its time. In an enhancement, alerts can be set to notify supervisors when agents are out-of-adherence and exception management can help ensure agents are correctly recognized for work they have performed.

The quality monitor 320 includes a content recorder (370) for recording agent-customer interactions. The content recorder 370 can be configured to capture all interactions, or a selected set of interactions based on user-defined business rules.

The content recorder 370 can capture voice and data interactions from both traditional and IP telephony environments and can handle high-volume recording for compliance and sales verification. The content recorder 370 can also record all voice transactions across multiple sites, or randomly capture a subset of transactions that may be of particular interest, as well as record contacts on-demand. Using the content recorder 370 a user can record all contacts or establish advanced business rules to capture only those transactions of particular interest. User-defined business rules can trigger the recordings, initiate enterprise collaboration by notifying individuals or groups of the captured contacts and emerging trends, and allow users to assign attributes or "tags" to the contacts for quick identification. All data related to a customer interaction—including navigation of automated systems, agent keystrokes and desktop activities—can be stored automatically in folders for search and retrieval. Different users in an enterprise can share and review transactions, as well as hear customer feedback first-hand.

The quality manager 320 stores the interactions in an interactions database 375, which may include descriptive information as well as recorded content. Contact center personnel play back some of the interactions and use an evaluation component (380) to score the agent in various categories (product knowledge, selling, listening, etc.)

Furthermore, contact center supervisors and quality analysts can then tap into these recorded interactions to review, evaluate, and score agent performance. An analytics component (385) can analyze interactions in various ways, including the use of speech analytics. Examples of analysis include categorizing calls based on content, analyzing a call against an expected call pattern and reporting exceptions to the pattern, and providing a visualization layer for recorded interactions that displays other data attributes such as agent activities coincident with call events.

The learning component 330 allows a contact center manager to develop training lessons for agents and assign lessons to agents. The learning component 330 provides automated training processes by identifying, scheduling, and delivering online learning directly to agent desktops. The lesson content can include recorded interactions, which can be used to create a library of best practices for training agents and other personnel. Using actual interactions, a contact center can develop E-learning content specific to the organization. In an enhancement, these training lessons can include assessments to help track and measure agent performance, skill acquisition, and knowledge retention.

The learning component 330 can also deliver targeted learning sessions over a network, using e-mail, or a hyperlink to a Web site, or directly to the agent desktop. Supervisors can select the appropriate training sessions from a library of courseware or create sessions themselves using a contact editing feature. Then supervisors can assign course material and monitor completion automatically.

The performance manager 340 displays key performance indicators (KPIs), which can be predefined on a scorecard. The scorecard, which can be role-appropriate, provides a statistical measure of how well an agent or group of agents is performing (against their goals). The KPI metrics are derived from quality evaluations and/or WFM call routing data.

A centralized administration component (390 consolidates agent administration across the various components into a single point of entry, and provides a single logon to all components for agents and administrators. The administration component 390 may also include a centralized reporting component, even across multiple sites. A consistent user interface (395) reduces training time on the various system components.

An integrated contact center system such as system 300 allows contact center analysts to quickly access the right information. Such an integrated system allows valuable and previously undiscovered information to be uncovered. This new level of visibility into contact center operations should allow personnel make better decisions faster.

Third Embodiment

Figure 4:
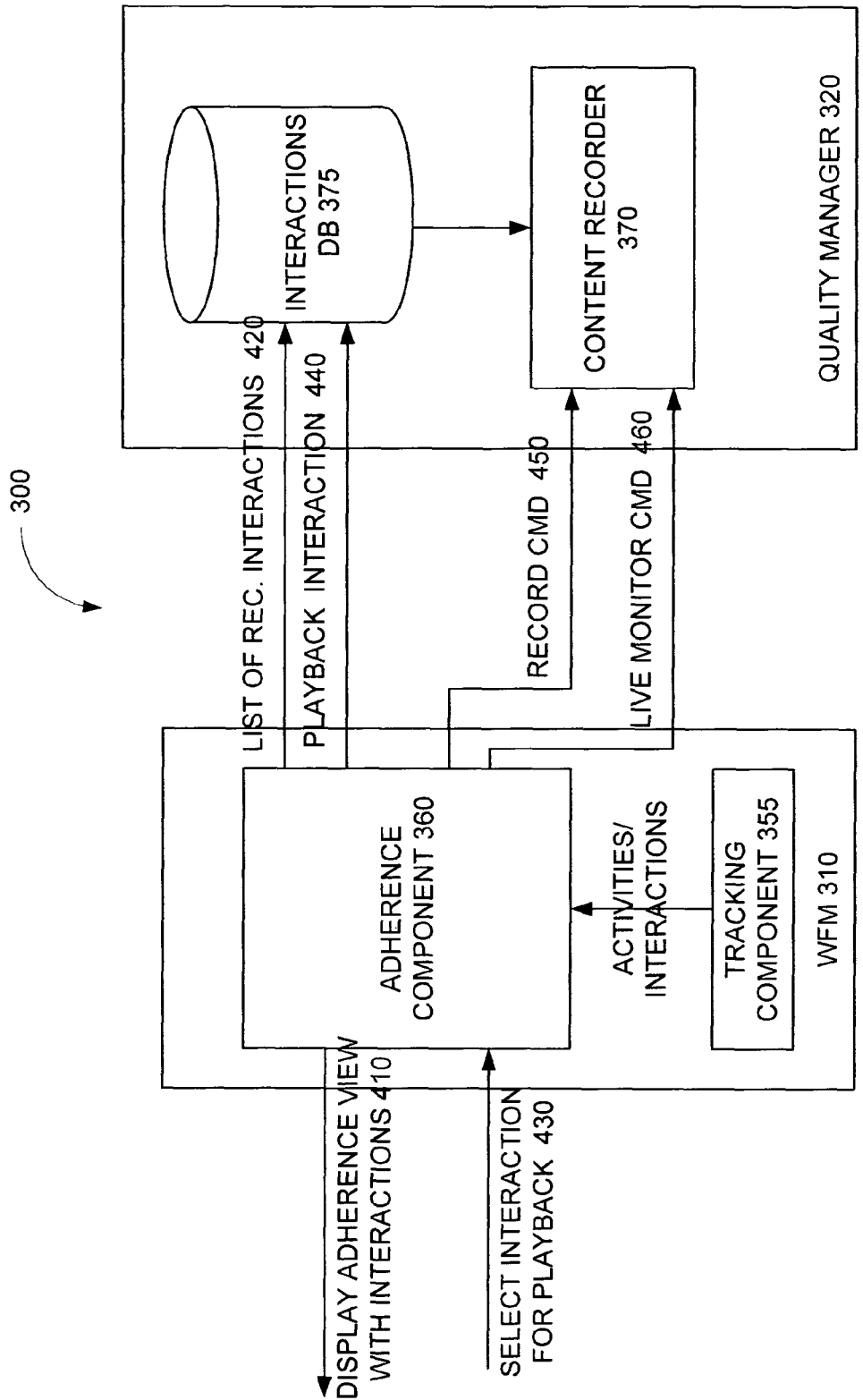
FIG. 4 shows a point of integration between the work force manager (WFM) and the quality monitor of FIG. 3.

FIG. 4 shows a point of integration between two components of the integrated contact center system 300, the WFM 310 and the quality monitor 320. Conventional call center systems provide an "interactions" application that allows playback of recorded interactions and live monitoring of interactions. Importantly, these conventional systems did not integrate interactions with WFM adherence information. The integration between the WFM 310 and the quality monitor 320 described in FIG. 4 allows a supervisor to "drill down" and examine a particular recorded interaction from a display of agent activity and/or adherence information.

In this disclosure, the term "interaction" refers to a record of the content of agent activities related to a call. Note that agent activities are not limited to audio of the call itself. Other forms of media are included. Examples of other types of interactions are: video recording of the agent; application activity on the agent's workstation 120; web pages delivered to the agent and/or customer during collaborative sessions; messages delivered through e-mail, instant messaging, or other messaging technologies. Also, the agent activities in an interaction are not limited to the duration of the call, but can occur after the call (a state called "wrap up" or "research").

The tracking component 355 of the WFM 310 provides information about agent activities to the WFM adherence component 360. Agent activities, which describe work activities performed by agents, are collected from various sources. The call router 140 (FIG. 1) reports agent call states (Available, After-Call-Work, etc.) An application monitor on agent workstations 120 tracks agent activity on the workstation (e.g., switching between applications, screen data, keyboard input, etc.).

The adherence component 360 displays a view (410) of agent activities, typically one agent per line, with activities arranged across a timeline. Exceptions to agent adherence (e.g., non-compliance with contact center policy) are displayed in conjunction with the activities and the timeline.

The adherence component 360 obtains a list (420) of recorded interactions available for agents during the displayed time period. This list of interactions is presented to the user in the same adherence view (410).

From this adherence view, a user can "drill down" to a recorded interaction by selecting (430) the interaction from the list, and then activating a playback tool. The adherence component 360 retrieves (440) the selected interaction from the interactions database 375, and the interaction is then played back using an appropriate application (e.g. media player, desktop activity player, web content player). A user can also select an agent activity that is presently occurring and either record on demand (450) or live monitor (460) the selected activity.

Integration between the WFM 310 and the quality monitor 320 is further described in the U.S. patent application "System and Method for Integrated Display of Recorded Interactions and Call Agent Data," having application Ser. No. 11/359,357, filed the same day and by the same assignee as the instant application.

Fourth Embodiment

Figure 5:
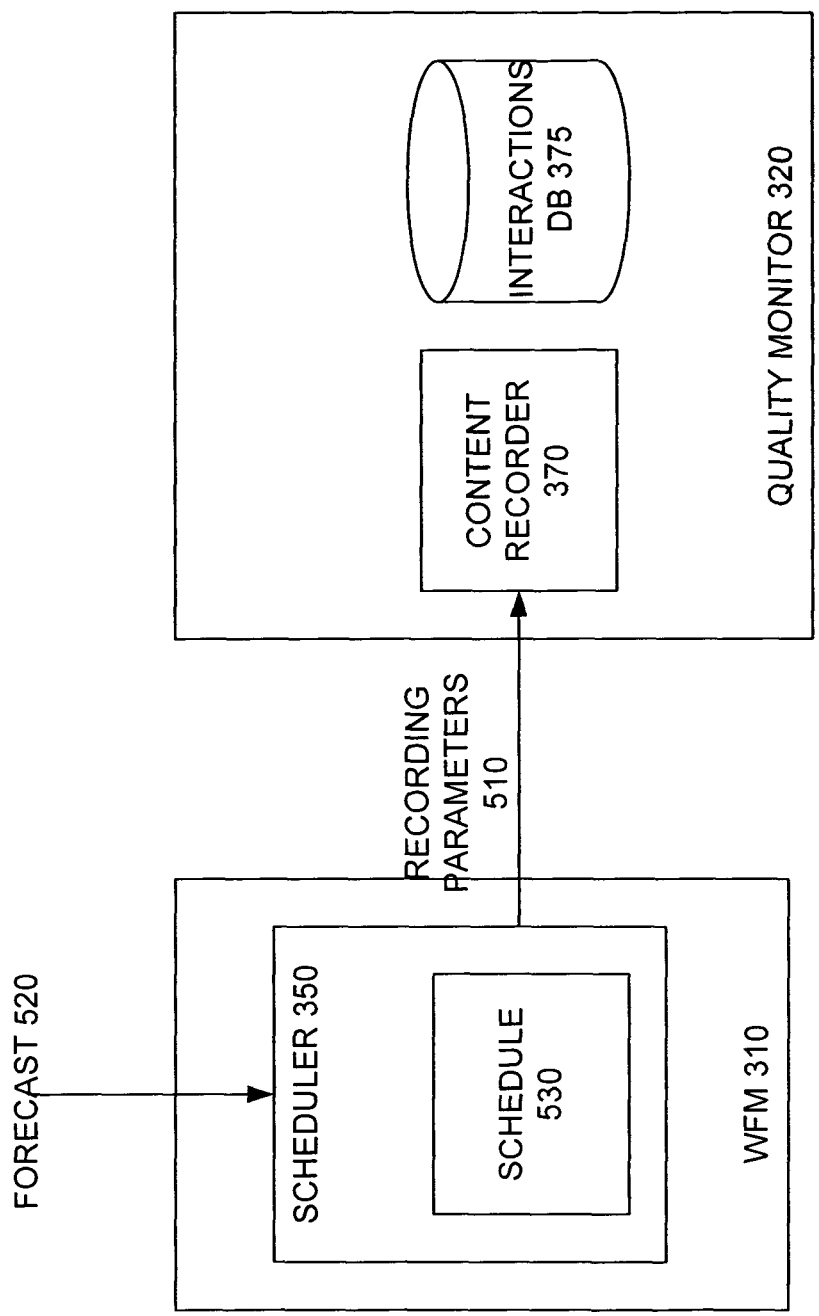
FIG. 5 shows another point of integration between the work force manager (WFM) and the quality monitor of FIG. 3.

FIG. 5 shows an additional point of integration between the WFM 310 and the quality monitor 320, in which agent activity, adherence, and/or scheduling information is used to trigger selective recording in a selective recording environment, or to perform smart selection of recording for evaluation in a total recording environment. In a conventional quality monitor 320, the content recorder 370 can be configured to record a certain number, or percentage, of agent-customer interactions. This parameter is typically fixed for the duration of a campaign, though it can vary from one campaign to the next.

In the integrated system 500, the WFM 310 generates call recording parameters 510 based on information contained in the forecast 520 (e.g., call volume and call type) and/or the schedule 530. The recording parameters 510 are provided to the content recorder 370 in the quality monitor 320. This integration allows the content recorder 370 to adapt recording behavior during a campaign.

As an example of how this feature is useful to a contact center, consider a marketing campaign that starts on a Monday and lasts all week. It is expected that call quality for agents on this campaign will be relatively low on Monday, since the material is new to the agents. By the end of the week, the agents are more familiar with the material, so that agent quality scores are expected to increase.

The recording parameters 510 provided to the content recorder 370 in the integrated system 500 allow a contact center manager to increase the percentage of interactions recorded at the start of the campaign, and to reduce the percentage as the campaign progresses. recording parameters 510 can be further associated with one agent, or a set of agents, so that inexperienced agents (e.g., agents with low scores) have a higher percentage of recorded interactions as compared to more experienced agents.

Other examples of using WFM data to determine recording behavior include: trigger or select recording based on relative elapsed time from the beginning of the shift; trigger or select recording before or after specific activities (e.g., after lunch or before break activity); and trigger or select recording based on adherence data (e.g., agent is on call but not adhering to schedule).

Fifth Embodiment

Figure 6:
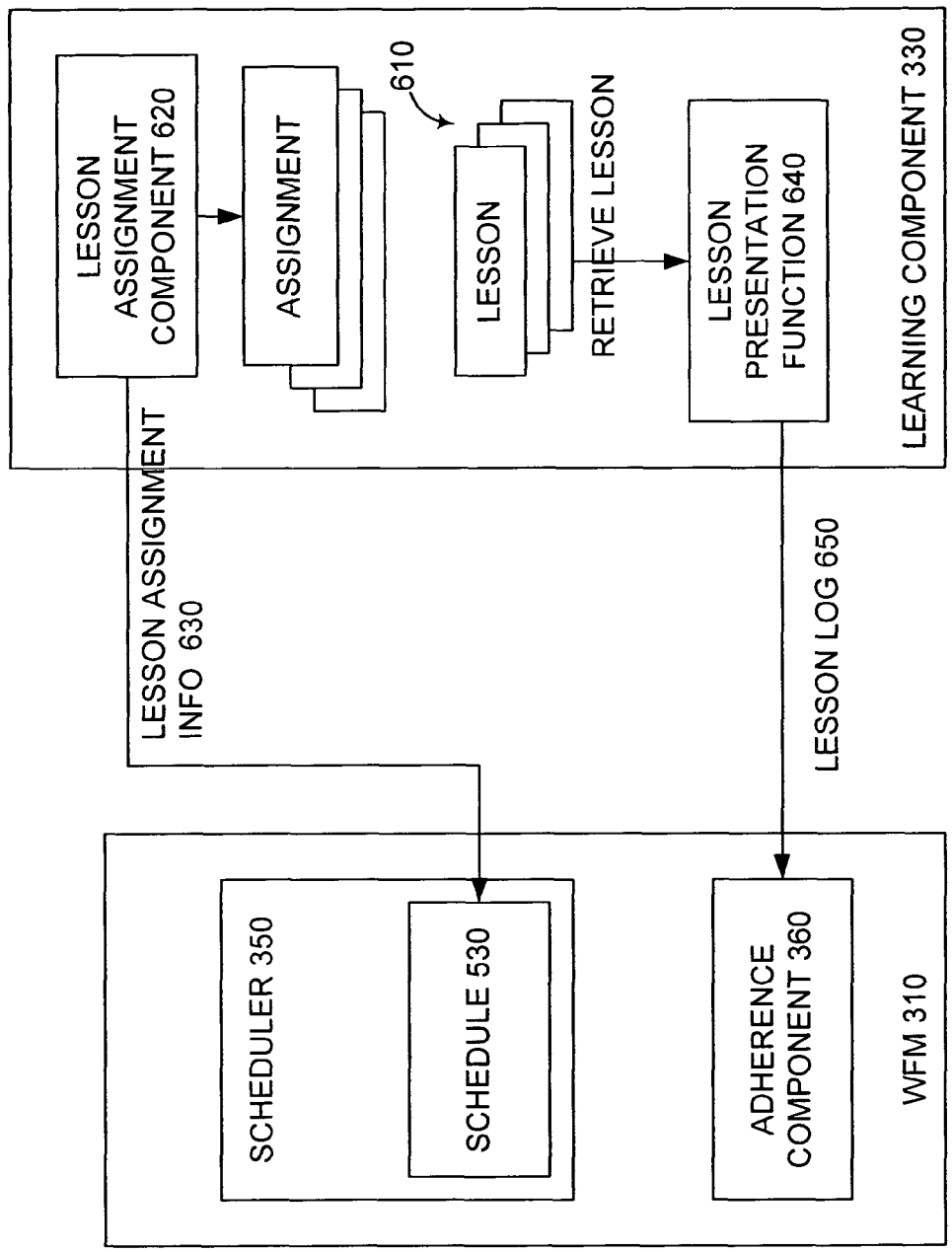
FIG. 6 shows several points of integration between the WFM and the learning component of FIG. 3.

FIG. 6 shows several points of integration between the WFM 310 and the learning component 330. The learning component 330 includes lessons 610. Each lesson 610 is designed to improve an agent's competence in a particular area. Lessons are assigned, either manually or automatically, through a lesson assignment component 620, which communicates information about the assignment (630) to the scheduler 350 in the WFM 310. In one embodiment, the information 630 includes an agent identifier, a lesson identifier, a lesson duration, and a lesson completion date. After receiving the lesson assignment information 630, the scheduler 350 modifies the schedule 530 to include a training activity for the identified agent. If possible, the new training activity is scheduled before the lesson completion date.

An agent receives training through a lesson presentation function 640. The presentation may take the form of viewing a video and/or listening to audio on the agent workstation 120. The lesson presentation function 640 maintains a lesson log 650 which tracks the presentation of lessons 610 to agents. In one implementation the lesson log 650 includes an agent identifier, a lesson identifier, the time when the lesson presentation began, and an indication of whether the lesson has been completed.

In yet another point of integration between WFM 310 and the learning component 330, the lesson log 650 is provided to the adherence component 360 in the WFM 310. The adherence component 360 uses information in the lesson log 650 to determine whether an agent has met the lesion completion date. If not, the adherence component 360 notes the incomplete lesson as an exception to adherence.

Scheduling assigned lessons and tracking adherence to these assignments is further described in the U.S. patent application "Tracking of Lesson Adherence in a Call Center Environment," having application Ser. No. 11/359,194, filed the same day and by the same assignee as the instant application.

Sixth Embodiment

Figure 7:
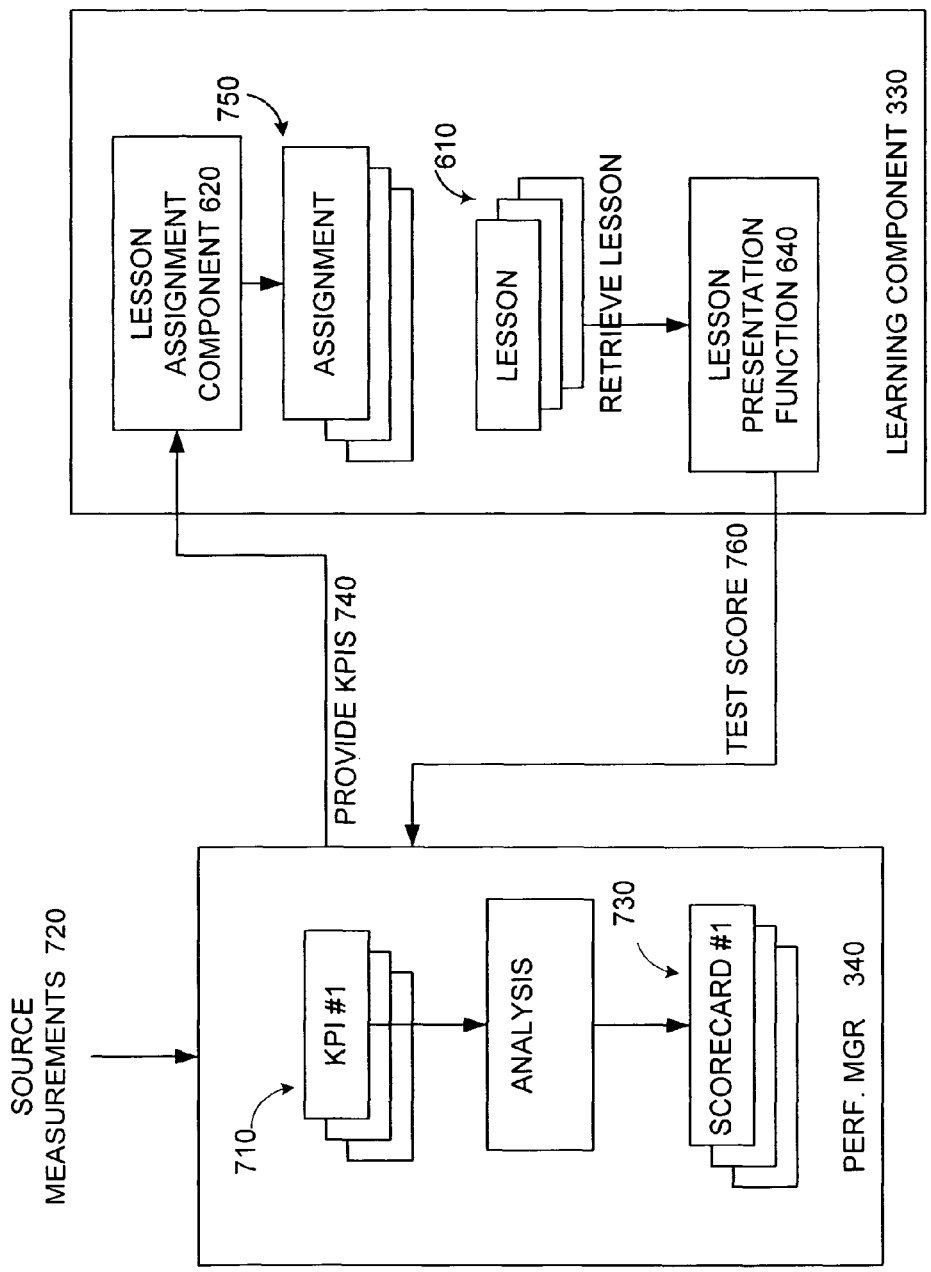
FIG. 7 shows several points of integration between the performance manager and the learning component of FIG. 3.

FIG. 7 shows several points of integration between the performance manager 340 and the learning component 330.

The performance manager 340 maintains more key performance (KPIs) 710 that measure how well an agent or group of agents is performing. The KPIs 710 may be based one or more source measurements 720, such as evaluations from the quality monitor 320 and call statistics from call router 140 (e.g., call duration, hold time during call, etc.)

The performance manager 340 does analysis on the KPIs 710 and/or the source measurements 720 to produce scorecards 730. The analysis may include calculating statistics such as average, variation, etc., aggregating by time period or groups of agents, and determining trends. The scorecards 730 are then presented in visual form to a user. Examples of scorecard are a daily scorecard for an agent or a team, and a scorecard of all agents for the past month.

In the integrated system 700, the KPIs 710 are also provided (740) to the learning component 330. As described earlier, the learning component 330 maintains lessons 610 which can be assigned to an agent for review. In the integrated system 700, each lesson 610 is associated with one or more KPIs 710. The lesson assignment component 620 examines one or more of the KPIs 710 for a particular agent, and makes an assignment (750) for a lesson 610 associated with that KPI 710, based on criteria associated with a KPI or a competency. In one implementation, the criteria is a comparison of one or more KPIs 710 for an agent to threshold values, and the lesson assignment component 620 assigns a lesson 610 if the KPI 710 is lower than the threshold. This point of integration therefore allows automatic lesson assignment based on KPI 710.

Automatic lesson assignment is further described in the U.S. patent application "Integration of E-Learning and Scorecards in Call Center Operation," having application Ser. No. 11/359,340, filed the same day and by the same assignee as the instant application.

The presentation may also include a test that is given to the agent to determine competency the area associated with the lesson 610. In yet another point of integration between WFM 310 and the learning component 330, the agent test score 760 for an agent is provided to the performance manager 340. The performance manager 340 updates the KPIs 710 to reflect the agent competency described by the test score 760.

Seventh Embodiment

Figure 8:
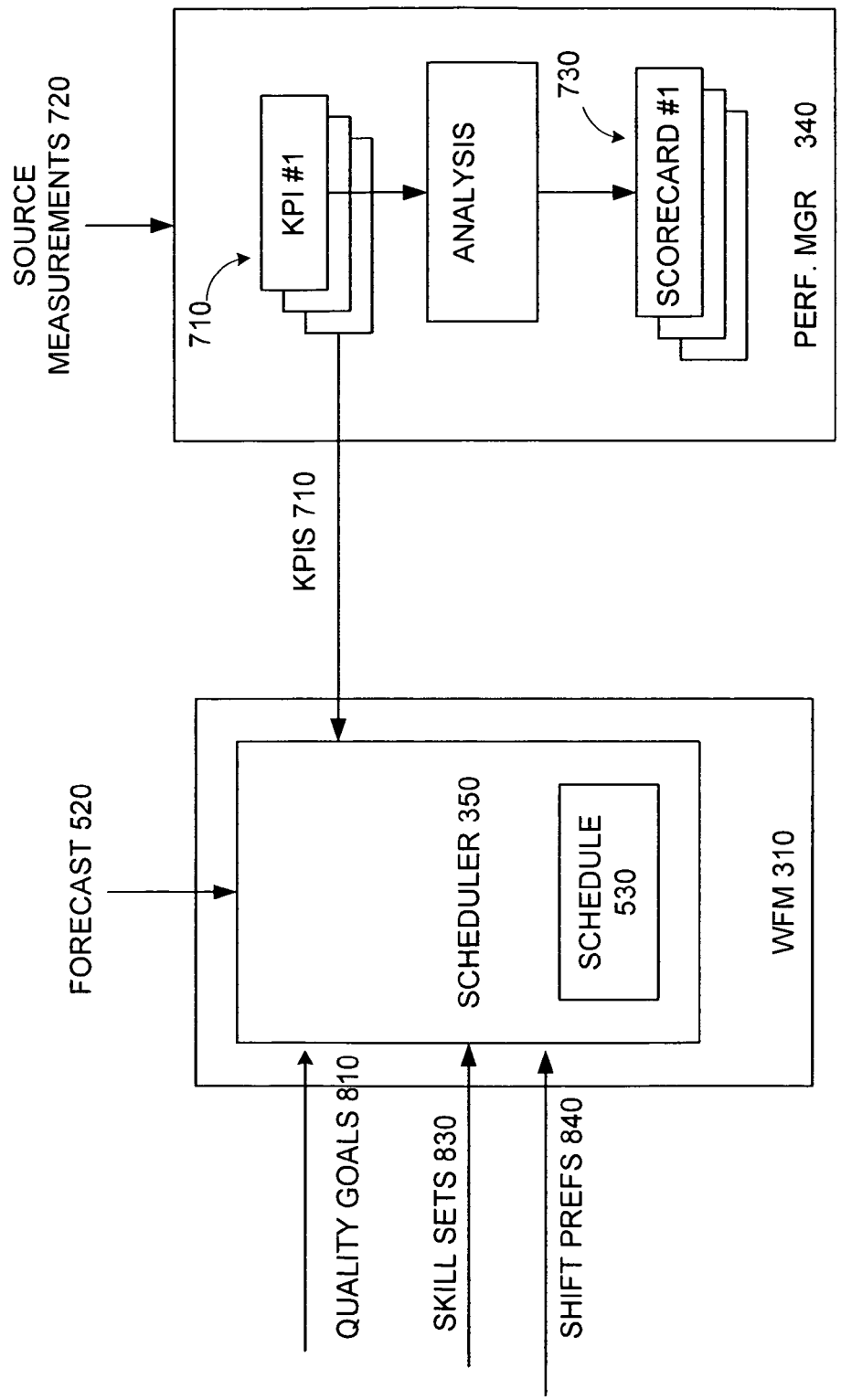
FIG. 8 shows a point of integration between the WFM and the performance manager of FIG. 3.

FIG. 8 shows a point of integration between the WFM 310 and the performance manager 340. Conventional schedulers allow agents to set preferences for shift assignments (e.g., one agent prefers to work weekends and another prefers to work nights). Since most agents are expected to prefer a day shift rather than a midnight shift, shift preferences are typically combined with agent ranking or seniority, so that someone works the midnight shift. This leads to a situation where the midnight shift is staffed with all of the "worst" agents.

As described earlier, the performance manager 340 maintains KPIs 710 that measure agent and/or group performance. In the integrated system 800 shown in FIG. 8, the scheduler 350 considers agent KPIs 710 when scheduling, so that some "good" agents are also added to the shift. The KPI 710 may reflect, for example, an evaluation of the agent's performance on a set of customer interactions. In one embodiment, the scoring is done by a human while playing back the recorded interaction. In another embodiment, the scoring is at least partly automated through the use of speech analytics.

The agent KPIs 710 are provided to the scheduler 350 in the WFM 310. Also provided to the scheduler 350 are quality goals 810 for a particular schedule interval. Examples of quality goals are "50% of agents have a score at of least 80" and "average score is at least 80."

The scheduler 350 considers the quality goals 810 and the KPIs 710, along with other inputs, to determine a schedule 530 which includes agent assignments to work activities at specific times. The scheduler 350 also considers other inputs, such as a workload forecast 820, agent skill sets 830 and agent shift preferences 840. The scheduler 350 then chooses a mix of agents to work a shift, so that the agent scores combine to meet the quality goals 810. Integration of KPIs and the scheduler is further described in the U.S. patent application "Systems and Methods for Scheduling Call Center Agents Using Quality Data," having application Ser. No. 11/359,731, filed the same day and by the same assignee as the instant application.

Eighth Embodiment

Figure 9:
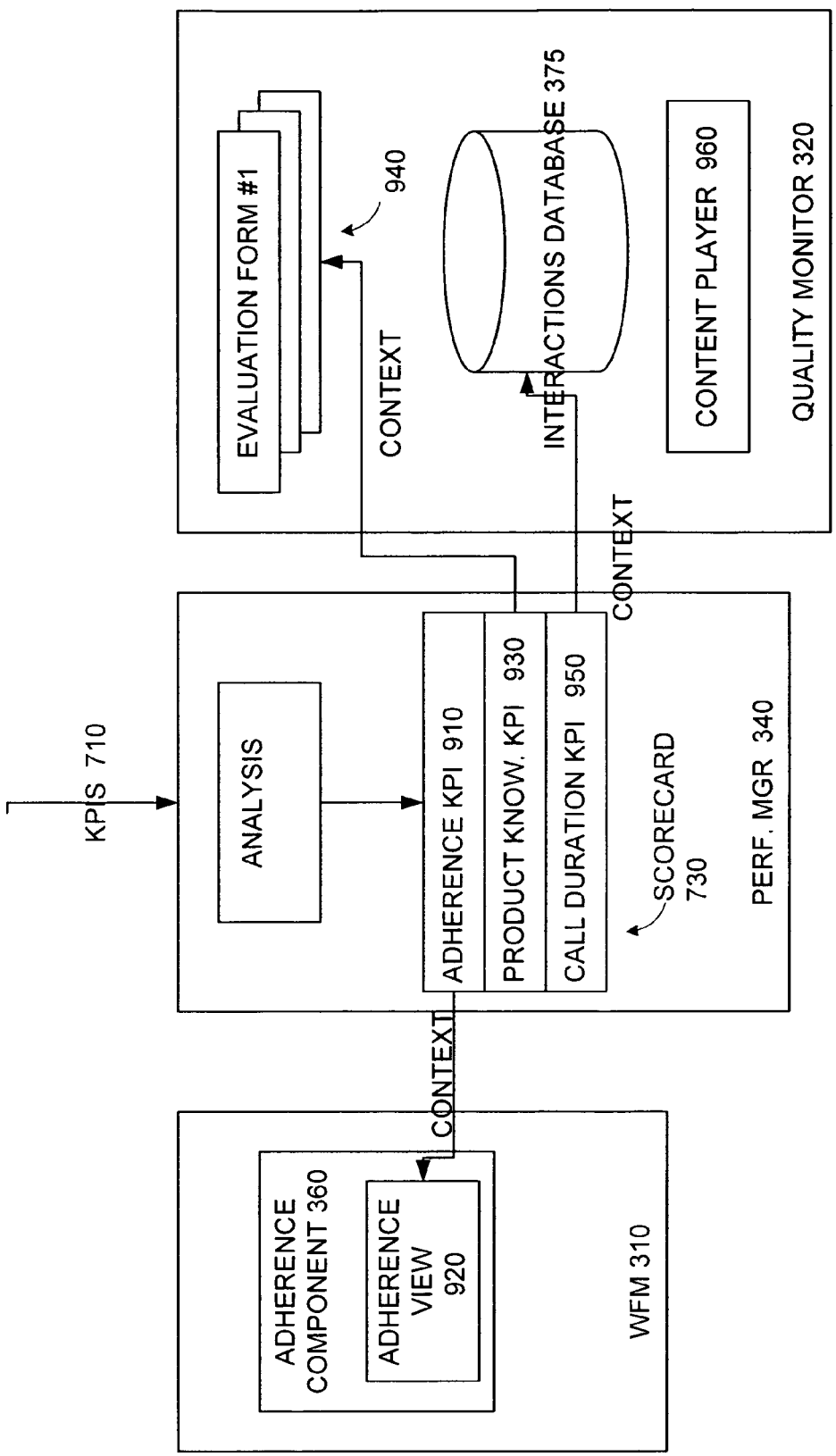
FIG. 9 shows another point of integration between the WFM and the performance manager of FIG. 3.

FIG. 9 shows another point of integration between the WFM 310 and the performance manager 340. As described earlier, the performance manager 340 maintains KPIs 710 that measure agent and/or group performance, and produces scorecards 730 from the KPIs 710. The scorecards 730 provide a quick way for a manager to determine areas that require attention. For example, if a particular agent is out of adherence or has a low competency score, then the adherence or competency KPI can be flagged with a warning icon. Typically, the manager wants more detailed information about the flagged problem area. A conventional contact center solution requires the manager to open up a particular application, such as Adherence or Quality Monitoring, to obtain detailed information about the problem area. Once in the application, the manager must then navigate to the root cause of the problem (e.g., the activity that was out of adherence).

In contrast, the integrated system 900 allows a user to quickly view details associated with the flagged problem area, in the appropriate application context. Several examples of this use of application context are shown in FIG. 9. When interacting with the performance manager 340, selecting an adherence-related KPI (910) in a scorecard 730 brings the user to a view (920) of adherence information. Furthermore, the particular agent activities that resulted in the out-of-adherence flag 910 are highlighted or otherwise brought to the user's attention in the view 920. As another example, selecting a quality score-related KPI (930) brings the user to the quality monitor 320, and more specifically to the particular evaluation form 940 which contains the flagged quality score 930.

As yet another example, selecting a call statistic-related KPI (950), such as call duration or hold time, brings the user to the quality monitor 320. The quality monitor 320 presents a list of recorded interactions (from the interactions database 375) which contributed to, or are in someway related to, the flagged call-statistic score 950. The user can then play back (960) one of the recorded interactions. The integrated system 900 thus greatly simplifies root cause analysis for contact center personnel.

Ninth Embodiment

Call recording and monitoring are vital to contact center operations and the business. Every day, insight and feedback on the organization are gained from customer interactions. Valuable business intelligence can be extracted from these calls to help call center executives improve operational efficiency, customer satisfaction, and profitability. Yet management can only listen to a small segment of recorded calls.

Managers must search manually through an enormous number of calls just to find the calls they need to analyze. The process is not only inefficient and expensive, but valuable information is continually ignored, leaving only a small sample of data needed to make informed business decisions.

Figure 10:
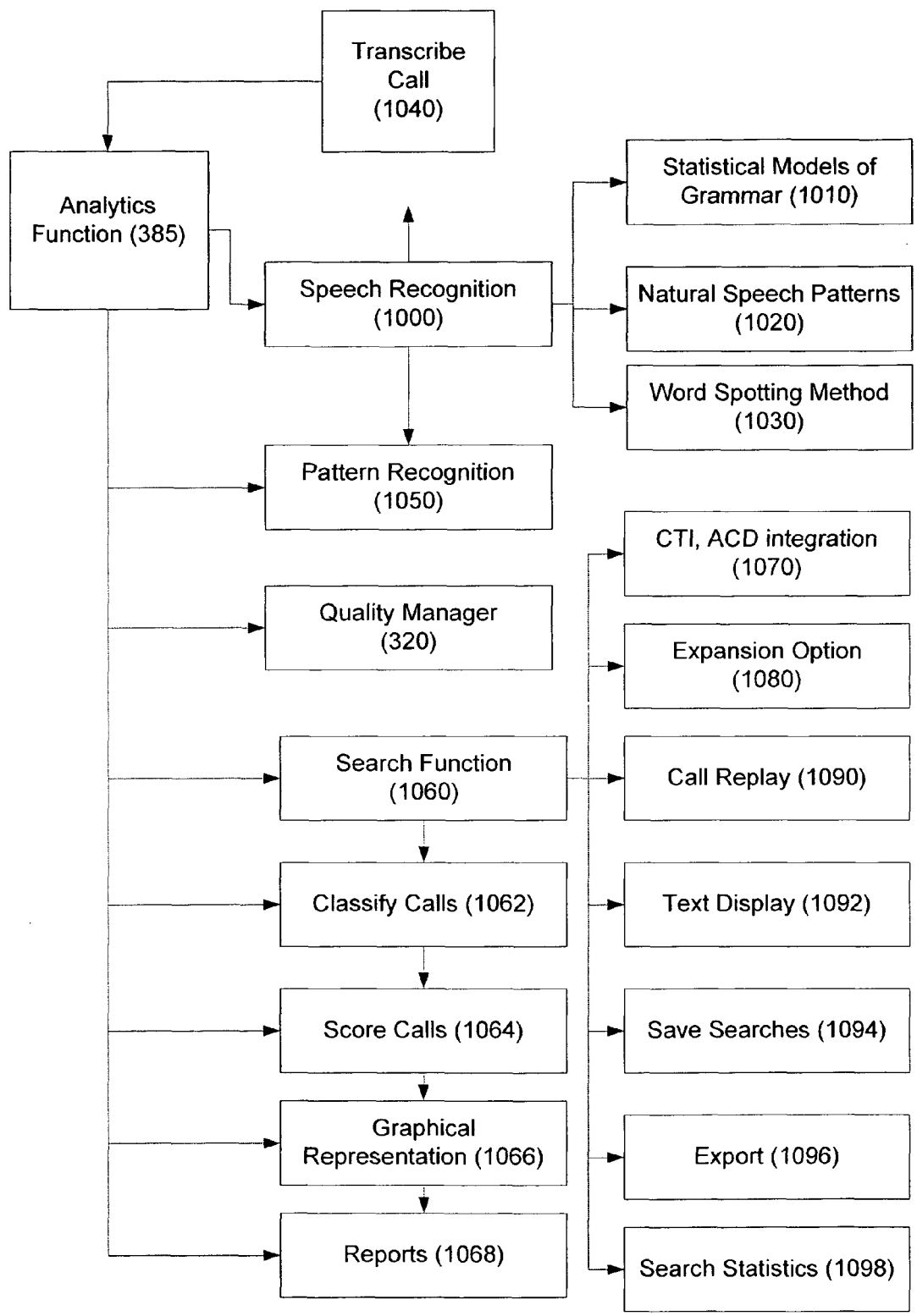
FIG. 10 shows components of the analytics function of FIG. 3.

Referring now to FIG. 10, with the analytics function 385 of the present invention (first introduced in FIG. 3), contact centers can now convert all call recordings into actionable business intelligence. Management can discern important competitive and business insight and easily identify trends from customer interactions, by analyzing speech, telephony, agent, and recording data together. In an enhancement, the analytics function 385 also streamlines the quality monitoring process by automatically classifying and scoring calls, based on selection criteria that may include any or part of the data captured by the integrated systems disclosed herein, including speech analytics.

The analytics function 385 of the present invention enables businesses to: (1) have a more accurate view of the customer experience, which allows executives across the organization uncover critical customer attitudes, needs, and requirements; (2) automatically score and classify calls for easy retrieval and examination, which enables call centers to digitally score calls to conduct automated quality and customer satisfaction surveys; and (3) discover trends related to customer behavior (e.g. churn, product adoption) that impact the business.

The analytics function 385 preferably uses speech recognition 1000 to convert the recorded calls into a searchable repository that allows for the query of words and/or phrases contained within the recorded calls. This repository may manifest itself as a text transcript or searchable phonetic model of the recorded calls. The analytics function 385 may apply additional unstructured data analysis techniques to refine and extract the context and further meaning from the conversations. Examples of various techniques that may be applied to refine the context of the mined speech, or the speech-to-text conversion, include: statistical modeling of grammar using a statistical model of grammar 1010 module; and natural language processing using a natural speech patterns 1020 module. Further, the analytics function 385 identifies the critical words and phrases within the context of the conversation. All this enables the embodiments disclosed herein to capture the intent of the call, rather than merely the words of the call.

In an alternate embodiment, the analytics function 385 converts the audio of the conversation into a phonetic representation of the call and uses a word-spotting method 1030 (or a query analysis), which flags or tags calls by a specific word, phrase, proximity, inflection, tempo, or emotion. Queries may be performed on an ad-hoc basis or stored for pattern analysis.

With the recorded calls converted to searchable content (via a transcribe call 1040 represented in FIG. 10), the analytics function 385 allows users to look back in time to discover what customers have said. In the preferred embodiment, users do not need to know in advance what they are looking for. For example, if there were a spike in call volume last week, the analytics function 385 can enable the contact center to understand the reason for the increased calls. Also, the user can incorporate metadata obtained from telephony or CRM systems to gain further insight into the reasons for the call spike.

In an enhancement, the analytics function 385 also uses a pattern recognition module 1050 to pull meaning out of the results generated by speech recognition. The pattern recognition module 1050 discerns the call's pattern and automatically places the call into one or several categories once the call is ingested into the speech engine, based on context the pattern recognition module 1050 is able to extract from the speech mining function. The patterns are used not only to classify calls but also to determine if a particular activity has occurred during the call, or to automatically score individual evaluation or survey questions based on this data. For instance a call score might be correlated to an existing evaluation or customer survey question during the call (e.g., "did the agent offer a cross sell", "did the agent remember to read the corporate policy"). By automating the labor-intensive quality monitoring processes, contact centers can realize not just a fast return on investment, but also deploy resources where they are strategic to the call center.

The analytics function 385 can link the call content to the metadata from, for example, a quality monitoring component (see FIG. 3), to relate characteristics such as agent ID, time/date, speaker's name, workgroup ID, and call routing. The analytics function 385 can link to custom data sources that may contain other information related to the agent/customer interaction, for example, a CRM system.

The analytics function 385 also includes a search function 1060. An append feature in the search function allows the user to modify the initial search by tacking on additional criteria and logic. A refine feature function allows the user to add to the search criteria, which are then used on the results of the last search. A remove feature allows the user to modify the initial search by tacking on additional criteria and logic. An undo allows any of the modifications just described to be reversed. In one enhancement, results from the initial search string using the search function 1060 can be refined to help focus on particular calls of interest. In another enhancement, users can combine the search functionality described above with data from the CTI, ACD and other sources via a CTI ACD integration 1070 module.

Different individuals use different words or phrases to depict a similar meaning. Recognizing this fact, the analytics function 385 enables users to expand single words into complete concepts, which convey intent and meaning, rather than being tied to one narrow possibility. An expansion option 1080 allows users to include plural, synonym, homonym, and containing words, in a single clean screen. For example, instead of searching for the single word "bill", the user can select to search for "bill, bills, account, charges, invoice, statement, billing, billed, bell", which will most likely return better results because it takes into account the differences of expression.

In one enhancement, the expansion option 1080 allows for the identification of temporal relationships between words, phrases and other collected events in order to better identify the context of the conversation. For example, a search that includes the word "supervisor" in a temporal relationship with words like "transfer me to", or in relationship to a call transfer event, can provide much more context than a search for "supervisor". The expansion option allows users to capture more instances of the concept that they are exploring and furthermore establish the intent of the calls. This improves upon keyword-spotting technologies, which are not good enough to perform ad-hoc searching for concepts, which is the ultimate goal in content discovery.

The analytics function 385 further enables the user a variety of ways to derive insight from the search results. The Call Replay 1090 component allows the user to listen to an audio file from the search results, in part or its entirety. Playing a portion of the audio allows the user more efficiently go through the search results without having to waste time listening to the whole conversation. The Text Display 1092 component shows a continuous text for the entire recognized content when playing back part or all of a call. This allows users quickly capture terms and expressions exchanged in the call that might be of importance. The Save Searches 1094 component allows a user to save and easily retrieve searches for further refinement and analysis. The Export 1096 component allows search results to be exported to a wide variety of formats, such as Microsoft Excel or Adobe PDF format. The Search Statistics 1098 component displays information on the current search (e.g. calls counted, search time). In one enhancement, the analytics function 385 further includes call visualization component which includes an interface for displaying the text of a set of calls along with other data captured by the integrated system of the present invention along with integrated sources. A call visualization component is more fully described in the '705 application and incorporated by reference above).

Preferably, the analytics function 385 automatically classifies and scores calls via classify calls 1062 module and a score calls 1064 module. This feature can greatly reduce the time and effort that contact centers spend on the quality monitoring process by "structuring" unstructured voice recordings and categorizing them. The classify calls 1062 module preferably classifies calls based on the content. A call may be classified into one or more "buckets." The analytics function 385 relies on the concept that all conversational threads have at their core one or more "patterns" of speech.

Patterns are complex descriptions of different ways that people communicate information, not just simple "words" for matching. These patterns of speech do not have to contain exact word matches for particular search terms, but they only "look" like a specific pattern. Each pattern is defined and assigned a weight by the pattern developer, and each area of intent is assigned a threshold. If a group of patterns match and their added weights exceed the threshold, then that conversation is said to "look" like and contain that intent.

The weights and threshold are user definable and therefore easily tweaked to produce better and more accurate results. A typical intent "bucket" will contain anywhere from five to 100 "patterns" to match. Patterns can be shared across domains and industries, and pattern bases can evolve forward to deliver ever more accurate and finely tuned pattern matching.

The analytics function 385 uses patterns not only to classify calls via the classify calls 1062 module, but also to evaluate if a particular activity occurred during a call via the score calls 1064 module. The user begins by designating the objective criteria on which the calls are to be scored into the application. A set of patterns is then described for the criteria. A call is then scored based on the extent to which the criteria patterns were fully met, partially met, or not met at all. Each weighted threshold for each score level can be customizable.

The analytics function 385 allows the user to create a graphical representation of trends found in the calls via a graphical representation 1066 module. This enables a user to view statistics about complex trends over a large time period.

The trend view displays a suite of ad-hoc reports that can be easily configured by the parameters in Table 1.

TABLE 1

| Time/Day Interval | Value to Calculate | Segmentation |
| --- | --- | --- |
| Day of Week | Avg # Words Per Call | By Agent |
| Month | Avg Call Length In Seconds | By Agent Group |
| By Week | Call Count | By Content Group |
| By Quarter | Hit Total | By Customer Account |
| By Year | Sum (WAVLength) | By Department |
| By Location | | |

By visualizing the information by the parameters above, the user can gain a more detailed view on the particularities of the search phrases.

Another trending capability is the display of, for example, the top 200 words mentioned in the recorded calls (where the number of top words is customizable). The analytics function 385 proactively shows the words that are unusually more frequent than before or compared to the standard language. This acts as an "early warning system" to enable organizations to understand how the conversations have changed from one period to the next.

Preferably, the analytics function 385 organizes and delivers results customized to the end-users requirements via a reports 1068 module. In an enhancement, reports 1068 module allows for scheduling options that enable users the ability to vary frequency of report delivery so analysts can zoom in on critical data metrics hourly, daily, monthly, etc. Users can customize and automate reporting. Once a query is created, the user can save the query to run automatically. Users can create and view reports in different formats while using the web-based viewer. For example, reports can be output as Excel or PDF files, and then emailed. The reports are interactive, in that calls can be played back live from the results of the report. The reports 1068 module, which is preferably based on industry-standard databases such as SQL, can be used to customize reports, to extract, format and report from the underlying data. In another enhancement, the reports 1068 module is a dashboard reporting system which can, for example, link the actual calls detected for each event or report.

General Purpose Computer

Figure 11:
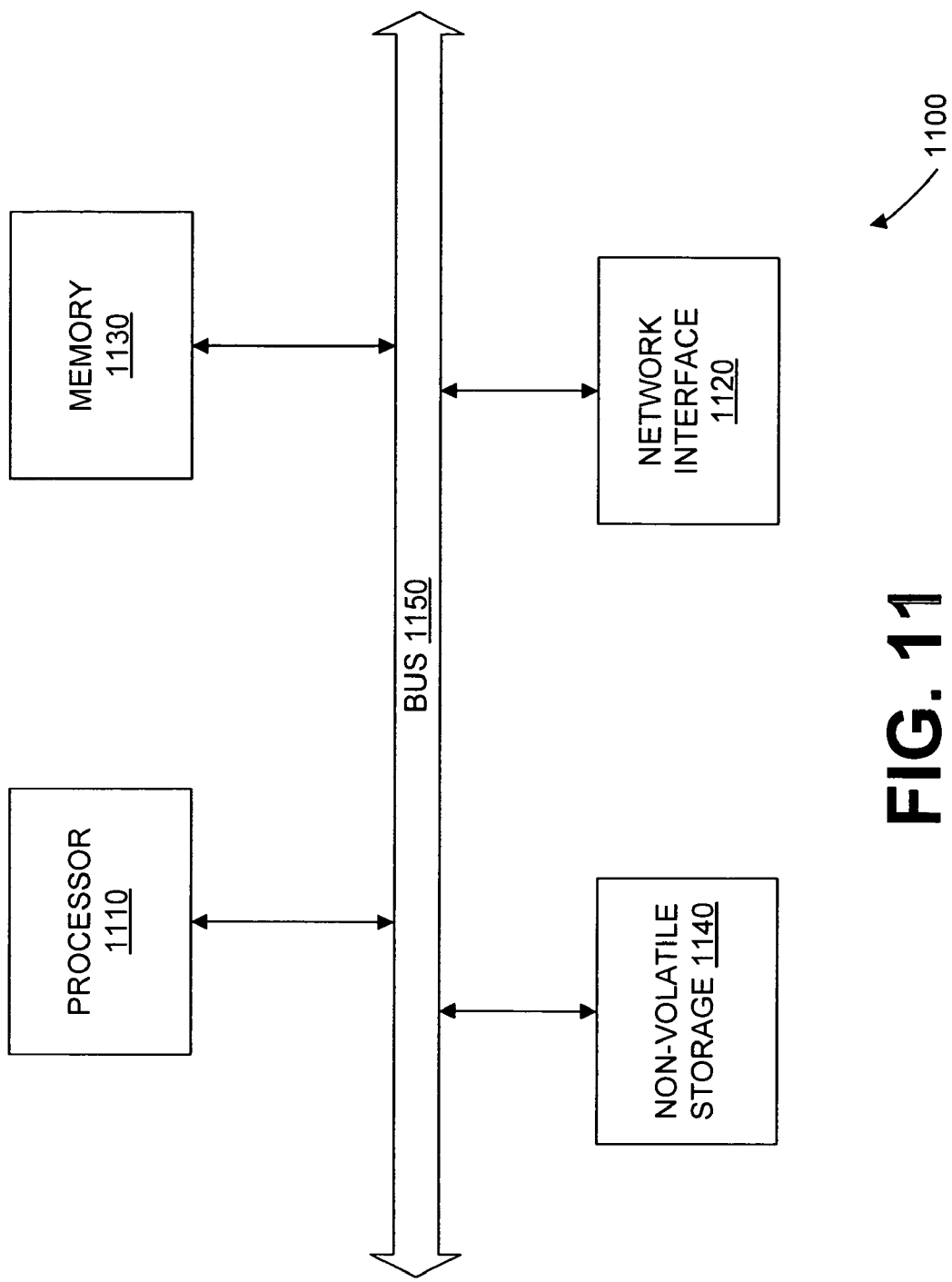
FIG. 11 is a hardware block diagram of a general-purpose computer that can be used to implement one or more of the components of the integrated contact center systems, processes or methods.

FIG. 11 is a hardware block diagram of a general-purpose computer 1100 that can be used to implement one or more of the components of the integrated contact center system 300 disclosed herein. The computer 1100 contains a number of components that are well known in the art of call center software, including a processor 1110, a network interface 1120, memory 1130, and non-volatile storage 1140. Examples of non-volatile storage include, for example, a hard disk, flash RAM, flash ROM, EEPROM, etc. These components are coupled via a bus 1150. The memory 1130 contains instructions which, when executed by the processor 1110, implement the methods and systems disclosed herein. Omitted from FIG. 11 are a number of conventional components, known to those skilled in the art that are unnecessary to explain the operation of the system 1100.

The systems and methods disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present invention includes embodying the functionality of the preferred embodiments of the present invention in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

We claim:

1. An integrated contact center comprising:
   at least one computing device;
   a content recorder configured to record content of a plurality of customer-agent interactions through a network;
   an analytics component of the at least one computing device configured to perform speech analysis using:
   an unstructured data analysis to extract context and identification of words/phrases;
   a conversion of audio of the customer-agent interactions to a phonetic representation to tag the customer-agent interactions;
   a plurality of patterns of at least a portion of the customer-agent interactions to determine patterns that match the customer-agent interactions, wherein each pattern has a weight and an associated bucket from a plurality of buckets; and
   a classification of the analyzed interactions into one of the plurality of buckets by matching the analyzed interactions with a predetermined number of patterns in the one of the plurality of buckets, and wherein it is determined if a sum of the weights of the predetermined number patterns associated with the one of the plurality of buckets that match the customer-agent interactions exceed a threshold for that bucket, the threshold being associated with an intent of a customer associated with the customer-agent interactions, and producing an evaluation based on the classification;
   a quality monitor of the at least one computing device configured to determine a quality score for one of the interactions, based at least in part on the evaluation produced by the analytics component;
   a learning component of the at least one computing device to deliver a targeted learning session to an agent through the network based at least in part on the quality score or the evaluation, wherein the lesson includes a lesson completion date; and
   an adherence component that determines if a lesson has been completed by the lesson completion date, and if not, notes an exception to adherence for the agent.

2. The integrated contact center of claim 1, wherein the analytics component is further configured to determine, based on the classification, whether one of a plurality of predefined activities occurred within the interaction.

3. The integrated contact center of claim 1, wherein the analytics component is further configured to classify calls into one of a plurality of call patterns based on content.

* * * * *